United States Patent

Stockman et al.

[11] Patent Number: 6,057,625
[45] Date of Patent: May 2, 2000

[54] POLE INSULATOR CAP

[75] Inventors: Michael L. Stockman; Michael A. Marks; Richard J. Rohan, all of Fort Wayne, Ind.

[73] Assignee: General Electric Company, Schenectady, N.Y.

[21] Appl. No.: 08/914,112

[22] Filed: Aug. 19, 1997

[51] Int. Cl.$^7$ .................................................. H02K 3/34
[52] U.S. Cl. ...................... 310/215; 310/214; 310/216; 310/194; 310/258; 310/259; 310/260; 310/270; 310/217
[58] Field of Search ................................. 310/214, 215, 310/216, 194, 258, 259, 260, 217, 270; 29/596, 597, 598

[56] References Cited

U.S. PATENT DOCUMENTS

| | | | |
|---|---|---|---|
| 941,456 | 11/1909 | Howell | 310/215 |
| 3,129,348 | 4/1964 | Simmons | 310/179 |
| 3,339,097 | 8/1967 | Dunn | 30/215 |
| 3,378,711 | 4/1968 | Swanke | 310/179 |
| 3,728,566 | 4/1973 | Costello | 310/194 |
| 4,217,690 | 8/1980 | Morreale | 29/596 |
| 4,247,978 | 2/1981 | Smith | 29/596 |
| 4,358,698 | 11/1982 | Peterson et al. | 310/187 |
| 4,481,435 | 11/1984 | Loforese | 310/71 |
| 4,629,918 | 12/1986 | Amendola et al. | 310/65 |
| 4,633,114 | 12/1986 | Reynolds | 310/194 |
| 4,816,710 | 3/1989 | Silvaggio et al. | 310/194 |
| 4,852,246 | 8/1989 | Rochester | 29/596 |
| 4,893,041 | 1/1990 | Snider et al. | 310/215 |
| 4,975,611 | 12/1990 | Rochester | 29/596 |
| 5,331,246 | 7/1994 | Baronosky | 310/194 |
| 5,698,923 | 12/1997 | Scherzinger et al. | 310/194 |

*Primary Examiner*—Elvin G. Enad
*Attorney, Agent, or Firm*—Welsh & Katz, Ltd.; Wayne O. Traynham

[57] ABSTRACT

A pole cap insulator is used in a field assembly of a motor having a cylindrical motor frame where the field assembly includes a winding having a central opening therein, and a pole member having a base portion with side surfaces and top and bottom surfaces. The pole cap insulator includes a generally rectangular body portion having a back edge disposed proximal the motor frame, and side boundaries disposed opposite each other. The body portion has a radially inwardly facing edge disposed opposite the back edge and tapered tip portions outwardly extending from opposite side boundaries cooperating with the radially inwardly facing edge to form a curved edge corresponding to a curved contour of the pole member. Also included are integrally formed side walls depending from the side boundaries of the body portion configured to engage a portion of the side surfaces of the pole member such that the body portion is retained on the top and bottom surfaces of the base portion so as to insulate the winding from the base portion when the base portion is received through the central opening of the winding.

17 Claims, 3 Drawing Sheets

POLE INSULATOR CAP

FIELD OF THE INVENTION

The present invention relates generally to a motor field assembly and more particularly to an integrally formed insulator for insulating a field winding from a motor pole.

BACKGROUND OF THE INVENTION

Electrical motors are often produced having a cylindrical frame and a series of field assemblies rigidly affixed to an inside wall of the motor frame. A rotor is centrally disposed within the frame and rotates about an axis of the motor. Each field assembly includes a winding and a pole member. The winding has a central aperture that receives a portion of the pole member. The pole member is composed of many layers of metal plates (e.g., laminations) that are fastened together by rivets or bolts. The pole member typically presents sharp corners, metal burrs, or rivet or bolt heads that may protrude from the surface of the pole member. These corners, burrs, and fastener heads, in conjunction with vibration produced during operation of the motor, tend to abrade the insulation of the winding. This leads to grounding or shorting of the winding.

To prevent grounding of the winding, field assemblies have been produced using costly and labor-intensive methods to insulate the winding. The winding is typically formed of copper wire that is machine wound with glass tape or other material to insulate the winding from the pole member. The taped winding is fitted on the pole member and the assembly is then dipped in a varnish bath. However, the process of applying the glass tape is expensive, and care must be taken to insure that the glass tape is not ripped by any sharp edges. Additionally, constant vibration of the motor may eventually cause grounding of the winding if the glass tape becomes sufficiently abraded.

In other cases, sheets of insulating material, such as NOMEX or MYLAR, are inserted between the winding and the pole member to insulate the winding from the pole member. Again, such processes are labor-intensive as the sheets must be placed in the proper location and held in place until fully secured. Additionally, insulating sheets do not always fully insulate the winding from the pole member after prolonged use of the motor, resulting in a grounded winding.

SUMMARY OF THE INVENTION

It is therefore desirable to provide the motor pole with a pole cap insulator that is inexpensive to produce and that requires minimal labor to install. In an exemplary embodiment of the invention, an integrally formed flexible pole cap insulator is disposed on the top and bottom portions of the pole member and includes side walls that overlap a portion of the side surfaces of the pole member. The pole cap insulator does not cover the entire side surfaces of the pole cap.

Each pole cap insulator has a generally flat rectangular body portion with a back edge disposed proximal the motor frame, and side boundaries disposed opposite each other. When the pole cap insulator is secured over the pole member, the back edge forms a "chord" relative to the inside curved surface of the motor frame, but does not necessarily contact the motor frame.

The body portion includes a radially inwardly facing edge disposed opposite the back edge, and tapered tip portions outwardly extending from opposite side boundaries cooperating with the radially inwardly facing edge to form a curved edge corresponding to a curved contour of the pole member. The curved contour of the pole member faces radially inwardly and provides the curved surface that is proximal the surface of the rotating rotor member, when present. A sufficiently large gap exists between the curved surface of the pole member and the surface of the rotor to prevent contact, yet the gap is sufficiently small to facilitate flux transfer.

Integrally formed side walls depend from the side boundaries of the body portion and are configured to engage at least a portion of the side surfaces of the pole member. The side walls engage a relatively small portion of the side surfaces of the pole member so that the corner areas of the pole member are insulated from the winding. The side walls inwardly slope relative to the side surfaces of the pole member to form an interference fit therewith so that the pole cap insulator is self-adhering to the pole member. This facilitates reception of the base portion within the central opening of the winding without requiring separate or additional means for securing the pole cap insulator to the pole member during assembly. Further, the side walls engage a portion of the pole member such that the insulator is self-adhering relative to the pole member. Because the side walls slope inwardly at a slight angle, the pole cap insulators essentially "snap-fit" over the pole cap so as to be self-adhering. During assembly, the pole cap insulators are simply placed over the top and bottom ends of the pole member and are held in place via the interference fit created between the side walls of the pole cap insulator and the side surfaces of the pole member. No additional binding members, ties, clamps, or fasteners are required. The pole cap insulator is simply placed over the pole member and the winding is assembled such that the pole member is received within the central opening in the winding. Then, the entire assembly is varnished to form the final field assembly. This simplifies the assembly procedure by reducing the number of steps and by reducing the time required to assemble the field assembly. Accordingly, production costs are reduced.

Because the side walls do not extend along the entire side surfaces of the pole member, the pole cap insulator is formed using a reduced amount of material. Additionally, two identical pole cap insulators are installed on each pole member. Thus, only a single pole cap configuration is required, which minimizes stocking and distribution costs. Other features and advantages of the invention will become apparent from the description that follows.

DETAILED DESCRIPTION OF AN EMBODIMENT OF THE INVENTION

Figure 1:
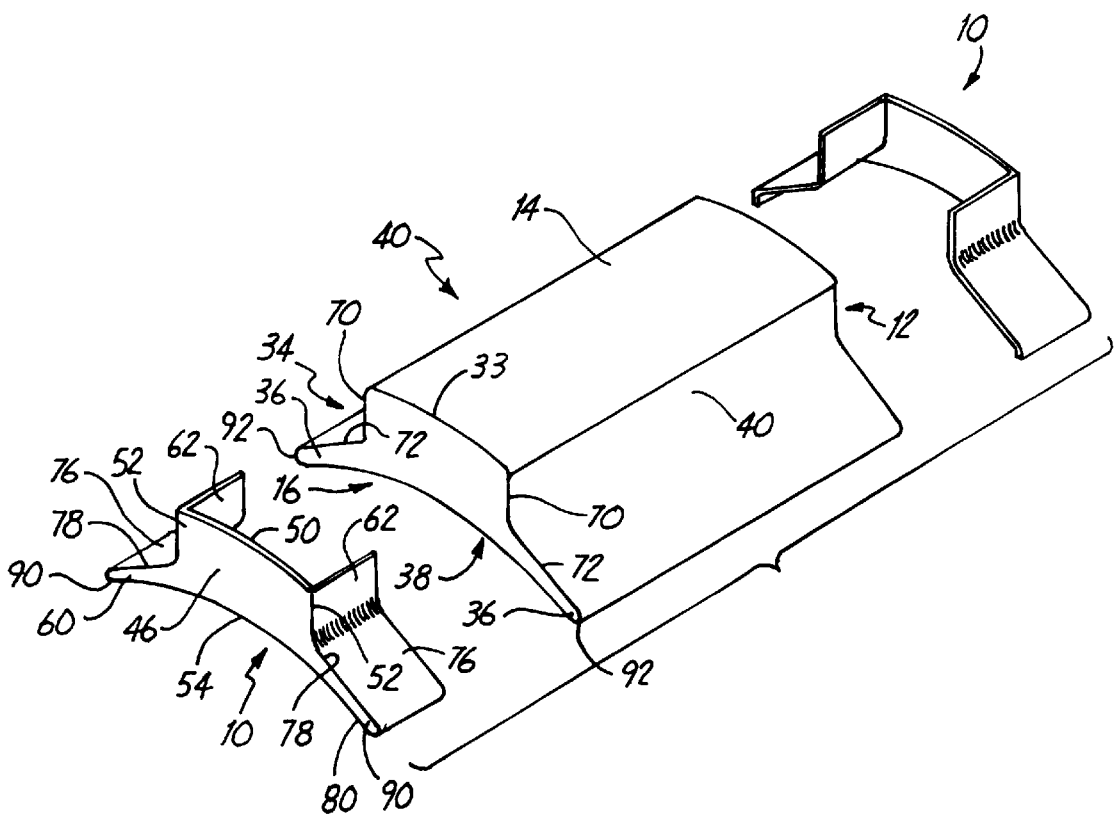
FIG. 1 is a perspective view of two pole cap insulators shown in an operative orientation relative to a pole member.

Referring now to FIG. 1, a specific embodiment of a pole cap insulator 10 is shown in an operative orientation where one pole cap insulator is positioned over a top surface 12 of a pole member 14 and another pole cap insulator is positioned over a bottom surface 16 of the pole member.

Figure 2:
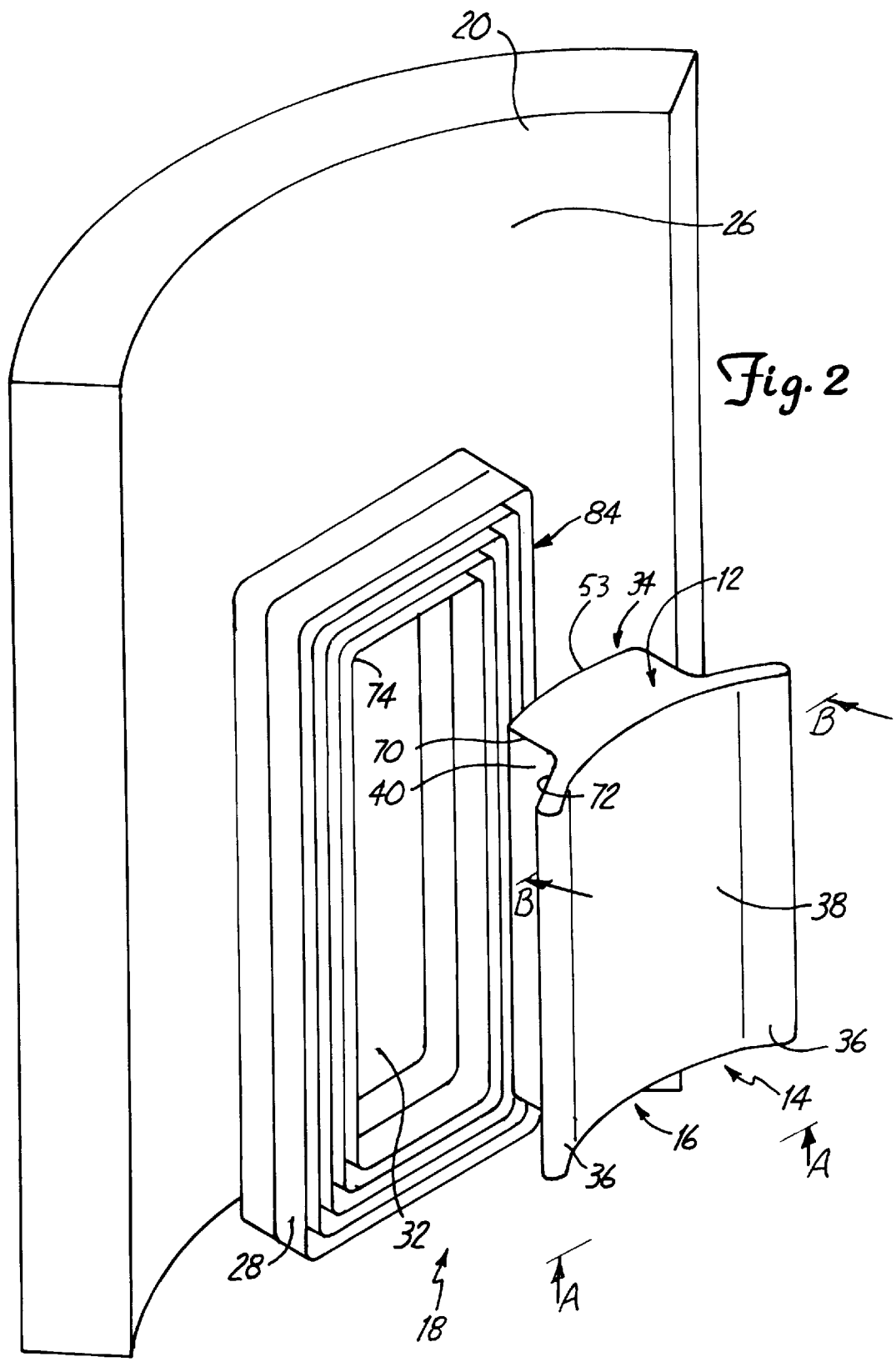
FIG. 2 is an exploded perspective view of a pole member, a winding, and a portion of a cylindrical motor frame.

Referring now to FIGS. 1–2, FIG. 2 illustrates a field assembly 18 shown in an exploded view. The field assembly 18 is disposed proximal a portion of a cylindrical motor frame or shell 20 having an inner surface 26. The principal components of the field assembly 18 include the pole cap insulators (FIG. 1), a winding 28, and a pole member 14. Several field assemblies 18 are bolted or fastened to the inner surface 26 of the motor frame 20 in an evenly spaced configuration about the inner circumference of the motor frame. The number of field assemblies 18 installed depends upon the specific requirements of the motor, such as torque and speed of rotation. An even number of field assemblies 18 are used.

The winding 28 is formed of coiled copper wire that is machine wound and is substantially rectangular in shape, having a slightly curved planar face. The copper wire is insulated with a coating of varnish or any other suitable insulation, so that the individual coils do not form a short circuit. The winding 28 has a central aperture 32 through which a base portion 34 of the pole member 14 is received. The winding 28 of each field assembly is interconnected, as is known in the art, and lead wires (not shown) are provided for external connection. The pole member 14 is preferably formed from many layers of 0.025 inch thick metal plates or laminations that are riveted together to form the pole member or laminated stack. The pole member 14 includes tapered pole tips 36 that extend outwardly from the base portion 34 to define a curved pole face 38 that faces radially inwardly and follows a curved contour that "tracks" the contour of the armature (not shown). The base portion 34 is generally rectangular in cross-sectional shape and includes side surfaces 40 in addition to the top surface 12 and the bottom surface 14.

Figure 3:
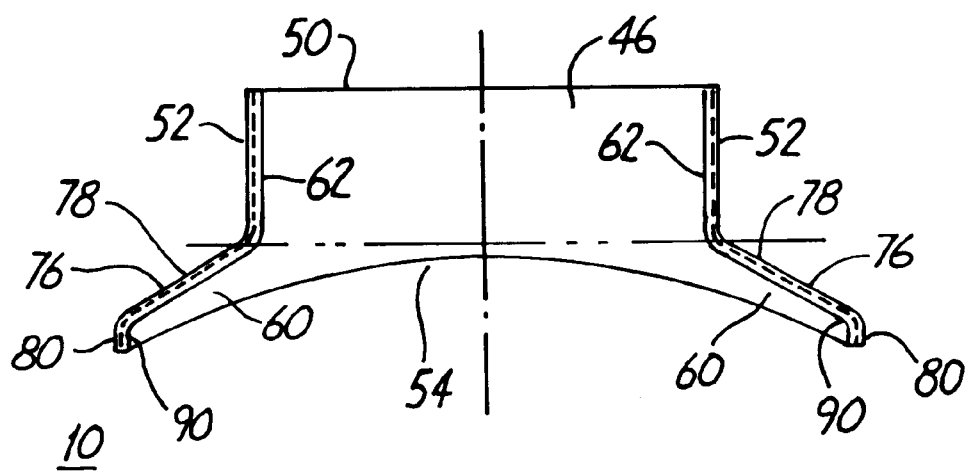
FIG. 3 is a top plan view of the pole cap insulator.

Referring now to FIGS. 1–3, the pole cap insulator 10 has a surface area configuration or shape as best viewed in FIG. 3, that closely approximates the surface area or shape of the pole member 14, as viewed in FIG. 2 along lines A—A. The pole cap insulator 10 includes a generally rectangular body portion 46 defined by a back edge 50, and side boundaries 52 disposed opposite each other. The pole cap insulator 10 further includes a radially inwardly facing curved edge 54 disposed opposite the back edge 50. The back edge 50 may be straight or may have a slightly curved contour that is coincident with a back edge 53 of the base portion 34 of the pole member 14 when the pole cap insulator 10 is placed over the top 12 or bottom 16 surfaces of the pole member. When the field assembly 18 is mounted to the inside curved surface 26 of the motor frame 20, the back edge 50 forms a "chord" relative to the inside curved surface of the motor frame, but does not necessarily contact the motor frame.

The pole cap insulator 10 includes two tapered tip portions 60 that are configured to outwardly extend from opposite side boundaries 52 of the body portion 46. The tapered tip portions 60 cooperate with the radially inwardly facing curved edge 54 to form a continuous curved edge corresponding to the curved contour of the pole face 38. Generally, the tapered tip portions 60 of the pole cap insulator 10 conform in shape to the shape of the tapered pole tips 36 of the pole member 14. Thus, the two dimensional plan shape of the pole cap insulator 10, as seen in the top plan view of FIG. 3, is defined by the back edge 50, the side boundaries 52, the curved edge 54, and the tapered tip portions 60.

Figure 4:
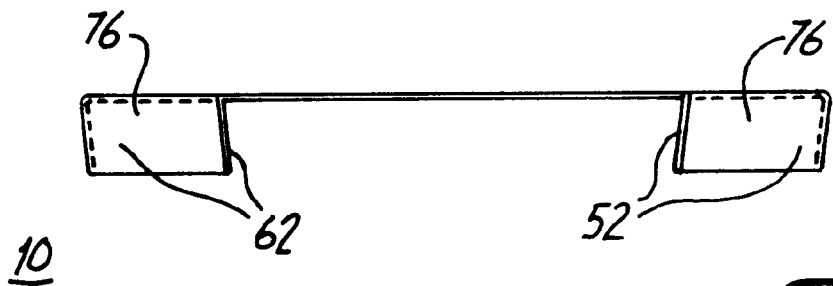
FIG. 4 is an end elevational view of the pole cap insulator.

Referring now to FIGS. 1, 2, and 4, the pole cap insulator 10 also includes integrally formed side walls 62 depending from the side boundaries 52 of the body portion 46, as best seen in FIGS. 1 and 4. The side walls 62 are configured to engage at least a portion of the side surfaces 40 of the pole member 14 such that the body portion 10 is retained on top 12 and bottom 16 surfaces of the pole member. As best shown in FIG. 4, the side walls 62 do not depend from the body portion 46 at a ninety degree angle. Rather, the side walls 62 inwardly slope relative to a plane perpendicular to the body portion 46. Accordingly, the side walls 62 are inwardly angled relative to the side surfaces 40 of the pole member 14 so as to provide an interference fit therewith when the pole cap insulator 10 is placed over the top 12 and bottom 16 surfaces of the pole member. The side walls 62 may slope at an angle of between zero degrees and ten degrees. Preferably, the angle of the slope is about three to six degrees.

Because the pole cap insulator 10 is formed from flexible material, the interference fit formed between the side walls 62 and the side surfaces 40 of the pole member 14 causes the pole cap insulator to self-adhere to the pole member. The material from which the pole cap insulator 10 is formed, may be for example, high-temperature plastic, RYNITE 530 plastic, or other suitable material.

The self-adhering feature of the pole cap insulator 10 provides advantages over the prior art. In operation, before the winding 28 is placed over the base portion 34 of the pole member 14, the pole cap insulator 10 is simply "snap-fitted" over the top 12 and bottom 16 surfaces of the pole member 14. The tension or resistance to deformation provided by the side walls 62 tends to create a slight compressive force acting against the side surfaces 40 of the pole member 14. This in turn, causes the pole cap insulator 10 to be self-adhering by "gripping" the side surfaces 40. Because the pole cap insulator 10 is self-adhering, no additional binding members, ties, clamps, or fastening means are required. Additionally, there is no need for a special "jig" to hold the pole cap insulator 10 in place during assembly of the winding 28. This reduces the number of assembly steps and reduces labor costs. The pole cap insulator 10 is simply press-fit over the pole member 14 and the winding 28 is then placed over the base portion 34 of the pole member so that the pole member is received within the central opening 32 in the winding.

In this way, the pole cap insulator 10 insulates the winding 28 from the pole member 14. Note, that because the side walls 62 do not extend along the entire length of the side surfaces 40 of the pole member 14, only the NOMEX insulation on the surface of the winding 28 insulates the winding from the side surfaces. However, no sharp edges exist along the side surfaces 40 to abrade the insulation. Further, a small gap exists between the side surfaces 40 and inside surface of the winding 28 due, in part, to the thickness of the pole cap insulator 10 which essentially "displaces" the winding from the pole member 14, as is shown by arrows B—B of FIG. 2.

Referring now to FIGS. 1 and 2, corner portions 70 of the base portion 34 and edge portions 72 of the tapered pole tips 36 present relatively sharp edges that must be insulated from the winding 28. As can be understood in FIG. 1, the pole cap insulator 10 insulates inside corner surfaces 74 of the winding 28 from the corner portion 70 and the edge portions 72 when the winding is placed over the pole member 14 and pole cap insulators.

As shown in FIGS. 1 and 3, the side walls 62 extended along the side boundaries 52 of the body portion 46, and also extend along the tapered tip portions 60 so as to form tip side walls 76 along a peripheral edge 78 of the tapered tip portions. The tip side walls 76 cooperate with the side walls 62 depending from the side boundary 52 so as to insulate a radially inwardly facing surface or face portion 84 (FIG. 1)

of the winding 28 from the tapered pole tips 36. As shown in FIG. 2, the winding 28 may have a slight radially inward curvature so as to conform in shape to the curvature of the tapered pole tips 36.

The tapered tip portions 60 also include an inwardly directed tip enclosure portion 90 integrally formed with the tip side walls 76. This tip enclosure portion 90 essentially protects or covers the extreme distal ends 92 (FIG. 1) of the tapered pole tips 36.

We claim:

1. An insulator for use in a field assembly of a DC motor having a cylindrical motor frame, the field assembly including a winding having a central opening therein and a pole member having a base portion with side surfaces and top and bottom surfaces, the insulator comprising:

a body portion;

the body portion having a radially inwardly facing edge disposed opposite a back edge of the body portion;

tapered tip portions outwardly extending from opposite side boundaries of the body portion, cooperating with the radially inwardly facing edge to form a curved edge corresponding to a curved contour of the pole member; and integrally formed side walls depending from the side boundaries of the body configured to engage at least a portion of the side surfaces of the pole member such that the body portion is retained on at least one of the top and bottom surfaces of the base portion so as to insulate the winding from the base portion when the base portion is received through the central opening of the winding.

2. The insulator according to claim 1 wherein the side walls inwardly slope relative to the side surfaces of the pole member to form an interference fit therewith.

3. The insulator according to claim 2 wherein the interference fit causes the insulator to be self-adhering to the pole member to facilitate reception of the base portion within the central opening of the winding.

4. The insulator according to claim 1 wherein the side walls engage a portion of the pole member such that the insulator is self-adhering relative to the pole member.

5. The insulator according to claim 1 wherein the side walls inwardly slope at about a three degree angle.

6. The insulator according to claim 1 wherein the side walls inwardly slope at an angle of about between zero and ten degrees.

7. The insulator according to claim 1 wherein the side walls and a portion of the body portion proximal the side walls insulate inside corner surfaces of the winding from a corner portion of the base portion.

8. The insulator according to claim 1 wherein the insulator is formed of high-temperature thermoplastic material.

9. The insulator according to claim 1 further including integrally formed tip side walls depending from the tapered tip portions and cooperating with the side walls depending from the side boundaries, to insulate a radially inwardly facing face portion of winding from the pole member when the base portion is received within the central opening of the winding.

10. The insulator according to claim 9 further including a radially inwardly directed tip enclosure portion integrally formed with the tip side walls and configured to engage and partially enclose distal ends of the tapered tip portions of the pole member.

11. The insulator according to claim 1 wherein the body portion has a generally rectangular shape.

12. An insulator for use in a field assembly of a DC motor having a cylindrical motor frame, the field assembly including a winding having a central opening therein and a pole member having a base portion with side surfaces and top and bottom surfaces, the insulator comprising:

a body portion;

the body portion having a back edge disposed proximal the motor frame, and side boundaries disposed opposite each other;

the body portion having a radially inwardly facing edge disposed opposite the back edge;

tapered tip portions outwardly extending from opposite side boundaries cooperating with the radially inwardly facing edge to form a curved edge corresponding to a curved contour of the pole member;

integrally formed side walls depending from the side boundaries of the body portion and inwardly sloping relative to the side surfaces of the pole member to form an interference fit therewith; and the side walls configured to engage at least a portion of the side surfaces of the pole member such that the body portion is retained on at least one of the top and bottom surfaces of the base portion so as to insulate the winding from the base portion when the base portion is received through the central opening of the winding.

13. The insulator according to claim 12 wherein the interference fit causes the insulator to be self-adhering to the pole member to facilitate reception of the base portion within the central opening of the winding.

14. The insulator according to claim 12 wherein the side walls engage a portion of the pole member such that the insulator is self-adhering relative to the pole member.

15. The insulator according to claim 12 wherein the side walls inwardly slope at about a three degree angle.

16. The insulator according to claim 12 wherein the body portion has a generally rectangular shape.

17. A field assembly of a motor having a cylindrical motor frame, the field assembly comprising:

a pole member having a base portion with side surfaces and top and bottom surfaces;

the pole member having tapered pole tips outwardly extending from the base portion to define a radially inwardly facing curved pole face;

a winding having a central opening therein configured to receive the base portion;

a unitary insulator configured to engage at least one of the top and bottom surfaces;

the insulator having a body portion and tapered tip portions outwardly extending from opposite sides of the body portion configured to engage the tapered pole tips and follow a contour of the curved pole face; and the insulator having integrally formed side walls depending from side boundaries of the body portion and configured to engage at least a portion of the side surfaces of the pole member such that the body portion is retained on at least one of the top and bottom surfaces of the base portion so as to insulate the winding from the base portion when the base portion is received through the central opening of the winding.

* * * * *